(12) United States Patent
Nagano et al.

(10) Patent No.: US 11,914,760 B2
(45) Date of Patent: Feb. 27, 2024

(54) INFORMATION PROCESSING DEVICE AND INFORMATION PROCESSING METHOD

(71) Applicant: SONY GROUP CORPORATION, Tokyo (JP)

(72) Inventors: Keijiroh Nagano, Tokyo (JP); Hidenori Aoki, Tokyo (JP); Haruka Fujisawa, Tokyo (JP); Fujio Arai, Tokyo (JP); Ryo Fukazawa, Tokyo (JP); Tomohiko Gotoh, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 147 days.

(21) Appl. No.: 17/596,272

(22) PCT Filed: Jun. 5, 2020

(86) PCT No.: PCT/JP2020/022382
§ 371 (c)(1),
(2) Date: Dec. 7, 2021

(87) PCT Pub. No.: WO2020/255758
PCT Pub. Date: Dec. 24, 2020

(65) Prior Publication Data
US 2022/0308657 A1    Sep. 29, 2022

(30) Foreign Application Priority Data

Jun. 19, 2019  (JP) ................. 2019-113367

(51) Int. Cl.
*G06F 3/01*     (2006.01)
*G06F 3/04815*  (2022.01)
*G06T 19/00*    (2011.01)

(52) U.S. Cl.
CPC .......... *G06F 3/011* (2013.01); *G06F 3/04815* (2013.01); *G06T 19/00* (2013.01)

(58) Field of Classification Search
CPC ....... G06F 3/011; G06F 3/04815; G06T 19/00
See application file for complete search history.

(56) References Cited

U.S. PATENT DOCUMENTS

2011/0205243 A1    8/2011  Matsuda
2013/0141419 A1    6/2013  Mount et al.
(Continued)

FOREIGN PATENT DOCUMENTS

CN    102193625 A    9/2011
CN    103140879 A    6/2013
(Continued)

OTHER PUBLICATIONS

International Search Report and Written Opinion of PCT Application No. PCT/JP2020/022382, dated Jul. 14, 2020, 08 pages of ISRWO.

*Primary Examiner* — Afroza Chowdhury
(74) *Attorney, Agent, or Firm* — CHIP LAW GROUP

(57) ABSTRACT

Provided is an information processing device, and an information processing method for curbing occurrence of a feeling of strangeness in augmented reality in a use environment for a plurality of people. Position information indicating the self position of an AR device that outputs an AR object that is shown to the user as if the AR object existed in real space is acquired by the AR technology, and a deviation weight which is an evaluation value indicating how easily a plurality of users recognizes that an arrangement position of the AR object is deviated from each other on the basis of position information of a plurality of the AR devices and the arrangement position of the AR object. Then, the output method of the AR object is adjusted according to the deviation weight to make it difficult to recognize occurrence of the deviation.

11 Claims, 13 Drawing Sheets

(56) References Cited

U.S. PATENT DOCUMENTS

| | | |
|---|---|---|
| 2013/0215149 A1 | 8/2013 | Hayashi |
| 2017/0171538 A1* | 6/2017 | Bell ...................... G06T 19/006 |
| 2020/0380719 A1* | 12/2020 | Iyer ................... G01C 21/3811 |

FOREIGN PATENT DOCUMENTS

| | | |
|---|---|---|
| EP | 2360567 A2 | 8/2011 |
| EP | 2624217 A1 | 8/2013 |
| JP | 2011-175439 A | 9/2011 |
| JP | 2014-203175 A | 10/2014 |
| JP | 2018-022376 A | 2/2018 |
| KR | 10-2011-0097639 A | 8/2011 |
| WO | 2012/042974 A1 | 4/2012 |

\* cited by examiner

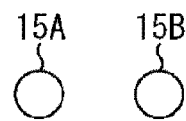
FIG. 11A 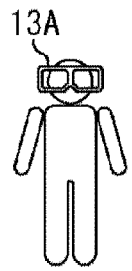 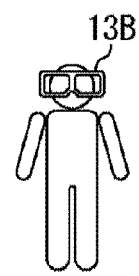
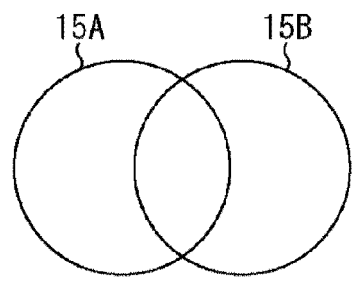
FIG. 11B 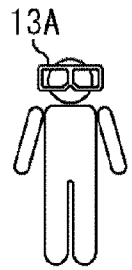 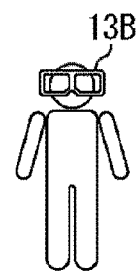

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/022382 filed on Jun. 5, 2020, which claims priority benefit of Japanese Patent Application No. JP 2019-113367 filed in the Japan Patent Office on Jun. 19, 2019. Each of the above-referenced applications is hereby incorporated herein by reference in its entirety.

TECHNICAL FIELD

The present disclosure relates to an information processing device, an information processing method, and a program, and particularly, to an information processing device, an information processing method, and a program capable of curbing occurrence of a feeling of strangeness in augmented reality in a use environment for a plurality of people.

BACKGROUND ART

Conventionally, an augmented reality (AR) technology has been put into practical use in which a video representing a virtual object such that the virtual object is superimposed on real space is presented to the user to make the user recognize the object as if the object existed in real space.

For example, an AR device that displays a video representing an object (hereinafter referred to as AR object) virtually disposed in the AR technology can create a map of the surrounding area, by estimating a self position using a technology such as simultaneous localization and mapping (SLAM). As a result, the AR device can display a video in which an AR object is shown as if the AR object is actually disposed in real space, and show the video to the user.

Incidentally, sometimes, an AR object is disposed in a position different from the original arrangement position of the AR object due to an error in estimation of the self position recognized by the AR device or an error in creation of the map of the surrounding area, for example.

In view of the foregoing, Patent Document 1 discloses a method of deriving a first evaluation value indicating the estimation accuracy of a position and attitude, deriving a second evaluation value indicating the superimposition accuracy of a virtual object on real space on the basis of the first evaluation value, and determining the arrangement of the virtual object in real space on the basis of the second evaluation value.

CITATION LIST

Patent Document

Patent Document 1: Japanese Patent Application Laid-Open No. 2018-22376

SUMMARY OF THE INVENTION

Problems to be Solved by the Invention

Incidentally, the method disclosed in Patent Document 1 described above is effective in a use environment in which one user uses an AR device. However, in a relative use environment in which a plurality of users uses an AR device, different errors occur in the plurality of AR devices. Hence, the method cannot deal with a situation where a common AR object viewed by the plurality of users is disposed in a different position for each user.

Accordingly, in a use environment in which a plurality of users uses an AR device, the line-of-sight of the users is directed in different directions even though the users are viewing a common AR object. This creates a feeling of strangeness regarding augmented reality among the users.

The present disclosure has been made in view of such a situation, and an object of the present disclosure is to curb occurrence of a feeling of strangeness in augmented reality in a use environment for a plurality of people.

Solutions to Problem

An information processing device according to one aspect of the present disclosure includes: a position information acquisition unit that acquires position information indicating a self position of an AR device that outputs an AR object shown to a user as if the AR object existed in real space by an AR technology; a weight calculation unit that calculates a deviation weight which is an evaluation value indicating how easily a plurality of users recognizes that an arrangement position of the AR object is deviated from each other on the basis of position information of a plurality of the AR devices and the arrangement position of the AR object; and an adjustment unit that adjusts an output method of the AR object according to the deviation weight to make it difficult to recognize occurrence of the deviation.

An information processing method or a program according to one aspect of the present disclosure includes: acquiring position information indicating a self position of an AR device that outputs an AR object shown to a user as if the AR object existed in real space by an AR technology; calculating a deviation weight which is an evaluation value indicating how easily a plurality of users recognizes that an arrangement position of the AR object is deviated from each other on the basis of position information of a plurality of the AR devices and the arrangement position of the AR object; and adjusting an output method of the AR object according to the deviation weight to make it difficult to recognize occurrence of the deviation.

In one aspect of the present disclosure, position information indicating a self position of an AR device that outputs an AR object shown to a user as if the AR object existed in real space is acquired by an AR technology, a deviation weight which is an evaluation value indicating how easily a plurality of users recognizes that an arrangement position of the AR object is deviated from each other on the basis of position information of a plurality of the AR devices and the arrangement position of the AR object is calculated, and an output method of the AR object is adjusted according to the deviation weight to make it difficult to recognize occurrence of the deviation.

BRIEF DESCRIPTION OF DRAWINGS

FIGS. 11A and 11B are diagrams for describing adjustment of the size of AR objects.

MODE FOR CARRYING OUT THE INVENTION

Hereinafter, a specific embodiment to which the present technology is applied will be described in detail with reference to the drawings.

<Configuration Example of AR System>

Figure 1:
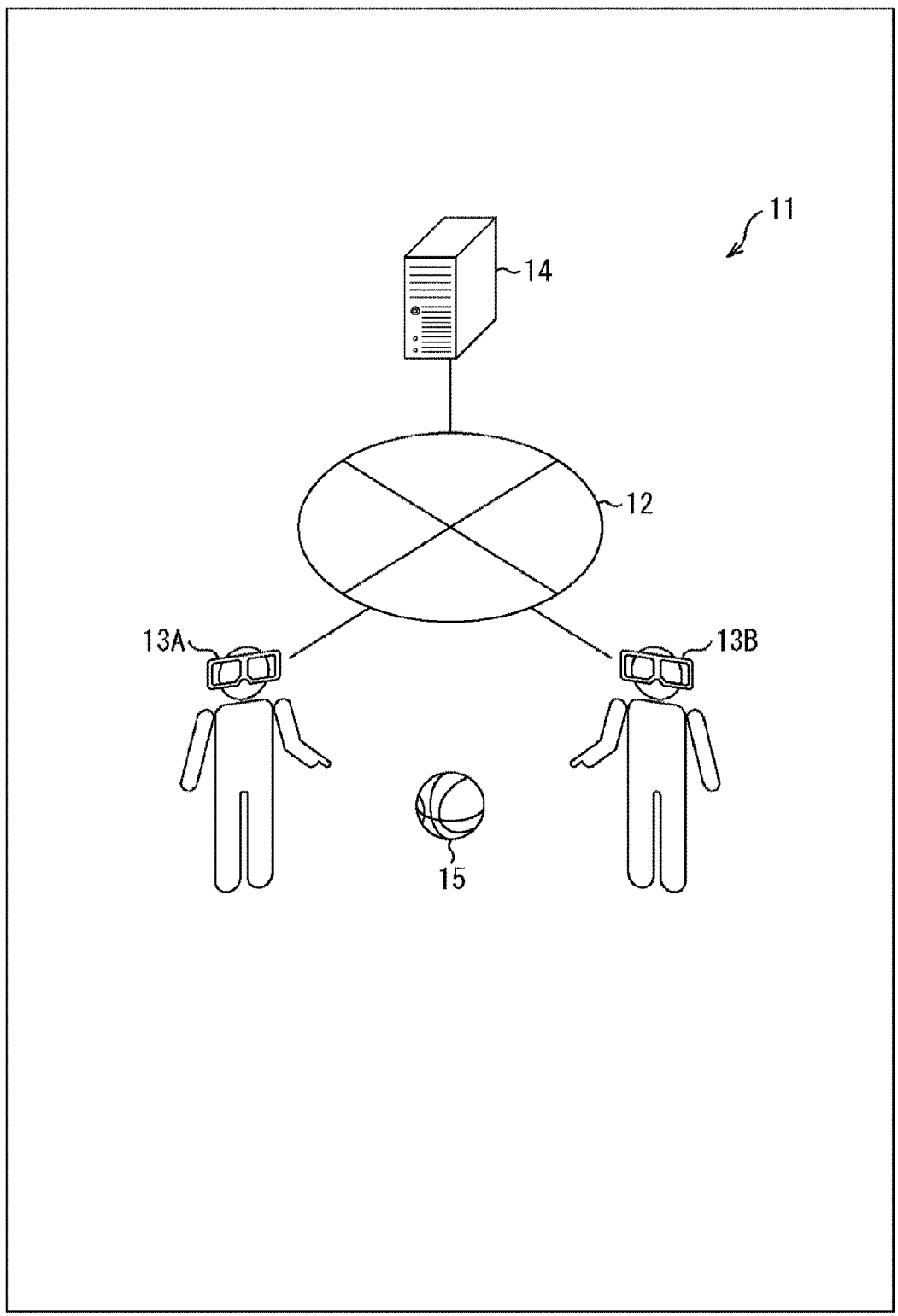
FIG. 1 is a block diagram illustrating a configuration example of an embodiment of an AR system to which the present technology is applied.

FIG. 1 is a diagram illustrating a configuration example of an embodiment of an AR system to which the present technology is applied.

As illustrated in FIG. 1, an AR system 11 is configured by connecting a first AR device 13A, a second AR device 13B, and a server 14 through a network 12 such as the Internet.

For example, FIG. 1 illustrates a use environment in which the AR system 11 is used by two users. That is, a user wearing the first AR device 13A and a user wearing the second AR device 13B can recognize an AR object 15 disposed in augmented reality space as if it existed in the same arrangement position in real space.

The first AR device 13A and the second AR device 13B have similar configurations, and will be simply referred to as an AR device 13 as appropriate in a case where it is not necessary to distinguish them. Then, the AR device 13 recognizes the self position using a technology such as SLAM, and displays a video of the AR object 15 that is shown to the user as if the object 15 existed in real space by the AR technology on the basis of the self position according to the coordinate system of each AR device.

The server 14 manages the self positions of the first AR device 13A and the second AR device 13B, and adjusts the display method of the AR object 15 according to the deviation weight based on the self positions and the arrangement position of the AR object 15. For example, the server 14 adjusts the display method of the AR object 15 so that even if an error occurs in each of the self positions recognized by the first AR device 13A and the second AR device 13B, it becomes difficult for the users to recognize that a deviation has occurred in the arrangement position of the AR object 15.

Accordingly, in the AR system 11, the user wearing the first AR device 13A and the user wearing the second AR device 13B do not recognize that a deviation has occurred in the arrangement position of the AR object 15. Hence, the users are prevented from feeling a strangeness regarding augmented reality, and can enjoy the augmented reality more.

<Configuration Example of AR Device and Server>

Figure 2:
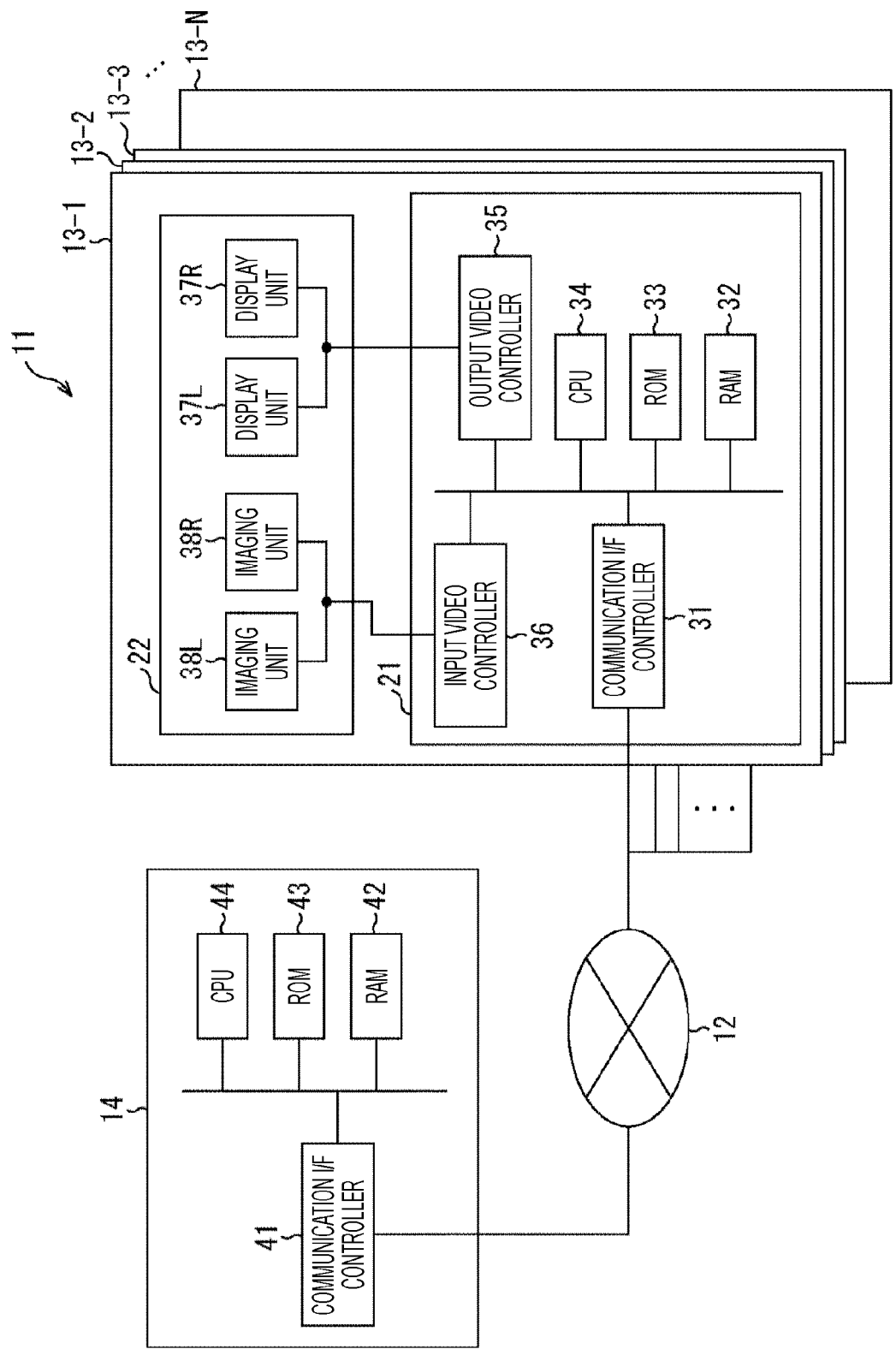
FIG. 2 is a block diagram illustrating a hardware configuration example of an AR device and a server.

FIG. 2 is a block diagram illustrating a hardware configuration example of the AR device 13 and the server 14 included in the AR system 11. Note that the configuration example of the AR system 11 illustrated in FIG. 2 is an example, and various configuration examples may be applied according to the application, purpose, and the like of the AR system 11. For example, if the function of the server 14 can be incorporated in the AR device 13, the AR system 11 can omit the server 14.

Furthermore, while the configuration example in which two devices of the first AR device 13A and the second AR device 13B are connected to the network 12 is illustrated in FIG. 1 described above, the AR system 11 can have a configuration example in which a plurality of (N in example of FIG. 2) AR devices 13-1 to 13-N is connected to the network 12 as illustrated in FIG. 2. That is, the AR system 11 can also be used by three or more users.

The AR device 13 includes a control unit 21 and an input/output unit 22. The control unit 21 has a configuration in which a communication interface (I/F) controller 31, a random access memory (RAM) 32, a read only memory (ROM) 33, a central processing unit (CPU) 34, an output video controller 35, and an input video controller 36 are connected through a bus. Furthermore, the input/output unit 22 includes two display units 37R and 37L and two imaging units 38R and 38L.

The communication I/F controller 31 controls communication through the network 12 and transmits and receives various types of information.

The RAM 32 rewritably stores various types of information necessary for the CPU 34 to execute a program. The ROM 33 stores a program executed by the CPU 34, initial setting information used in the program, and the like.

The CPU 34 reads the program from the ROM 33, develops the program in the RAM 32, and executes the program, thereby implementing the function of each block described below with reference to FIG. 3.

The output video controller 35 controls output of the video representing the AR object 15 to the display units 37R and 37L. The input video controller 36 controls input of videos captured by the imaging units 38R and 38L to the control unit 21.

The display units 37R and 37L are arranged in front of the right and left eyes of the user wearing the AR device 13, for example. Then, when the display unit 37R displays the video for the right eye and the display unit 37L displays the video for the left eye, the user can recognize the AR object 15 in such a manner as to feel the depth of the desired arrangement position.

For example, the imaging units 38R and 38L image the line-of-sight direction of the user wearing the AR device 13. Furthermore, by arranging the imaging units 38R and 38L at an interval corresponding to a predetermined parallax, the surrounding environment can be stereoscopically grasped on the basis of the images captured by the imaging units 38R and 38L, respectively, and the imaging units 38R and 38L can be used for recognition of the self position of the AR device 13.

The server 14 has a configuration in which a communication I/F controller 41, a RAM 42, a ROM 43, and a CPU 44 are connected through a bus.

The communication I/F controller 41 controls communication through the network 12 and transmits and receives various types of information.

The RAM 42 rewritably stores various types of information necessary for the CPU 44 to execute a program. The ROM 43 stores a program executed by the CPU 44, initial setting information used in the program, and the like.

The CPU 44 reads the program from the ROM 43, develops the program in the RAM 42, and executes the program, thereby implementing the function of each block described below with reference to FIG. 4.

Figure 3:
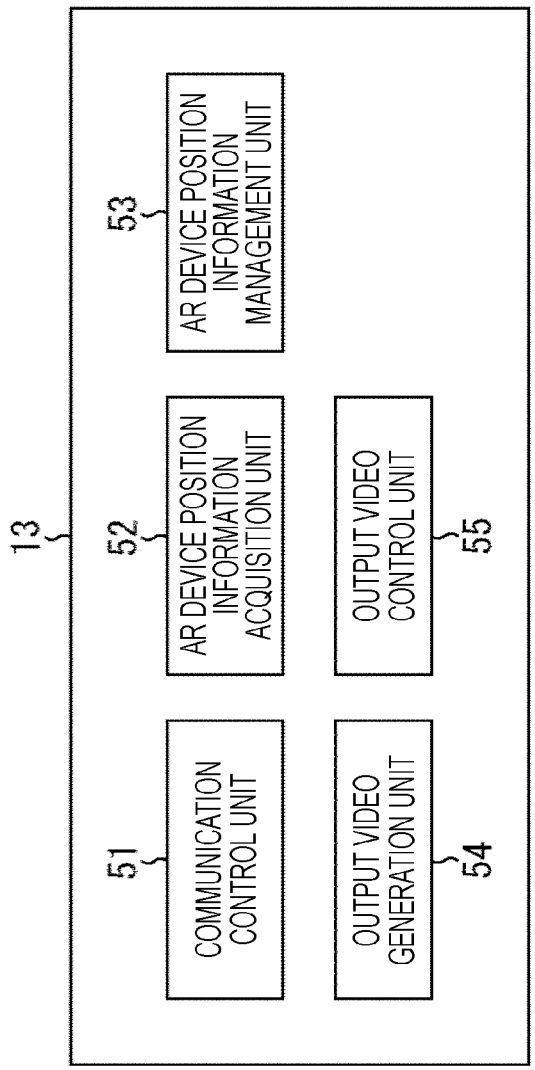
FIG. 3 is a block diagram illustrating a functional configuration example of the AR device.

FIG. 3 is a block diagram illustrating a functional configuration example of the AR device 13.

As illustrated in FIG. 3, the AR device 13 includes a communication control unit 51, an AR device position information acquisition unit 52, an AR device position information management unit 53, an output video generation unit 54, and an output video control unit 55.

The communication control unit 51 communicates with another AR device 13 and the server 14 through the network 12. For example, the communication control unit 51 transmits AR device position information, which is information indicating the self position of the AR device 13, to the server 14, and receives AR display object information (e.g., information indicating arrangement position and the like when AR object 15 is displayed) transmitted from the server 14 and supplies the AR display object information to the output video generation unit 54.

The AR device position information acquisition unit 52 recognizes the self position of the AR device 13 on the basis of the videos captured by the imaging units 38R and 38L, sensor information detected by a sensor such as a gyro (not illustrated), and the like, acquires the AR device position information, and supplies the AR device position information to the AR device position information management unit 53. Note that AR device position information includes information indicating a position with respect to the origin, which is a reference when creating the surrounding map of the AR device 13, and information indicating the attitude (inclination) of the AR device 13.

The AR device position information management unit 53 manages the AR device position information acquired by the AR device position information acquisition unit 52, and constantly updates the AR device position information to the latest AR device position information. Similarly, in a case where the AR device position information management unit 53 acquires the AR device position information of another AR device 13, the AR device position information management unit also manages the AR device position information of the other AR device 13 and constantly updates the AR device position information to the latest AR device position information. Then, the latest AR device position information regarding the own AR device 13 managed by the AR device position information management unit 53 is read by the communication control unit 51 and transmitted to the server 14.

The output video generation unit 54 reads the latest AR device position information regarding the own AR device 13 from the AR device position information management unit 53. Then, the output video generation unit 54 performs video generation processing of generating a video representing the AR object 15 according to the AR device position information and the AR display object information supplied from the communication control unit 51, and outputs the generated video. For example, the output video generation unit 54 provides a parallax such that the user recognizes a depth according to a distance from the self position of the AR device 13 indicated by the AR device position information to the arrangement position of the AR object 15 indicated by the AR display object information, and generates videos for the right eye and the left eye that make the user recognize the AR object 15 as if the AR object 15 was disposed in the arrangement position.

The output video control unit 55 controls output of the video so that the video generated by the output video generation unit 54 has a format that can be displayed on the display units 37R and 37L.

Figure 4:
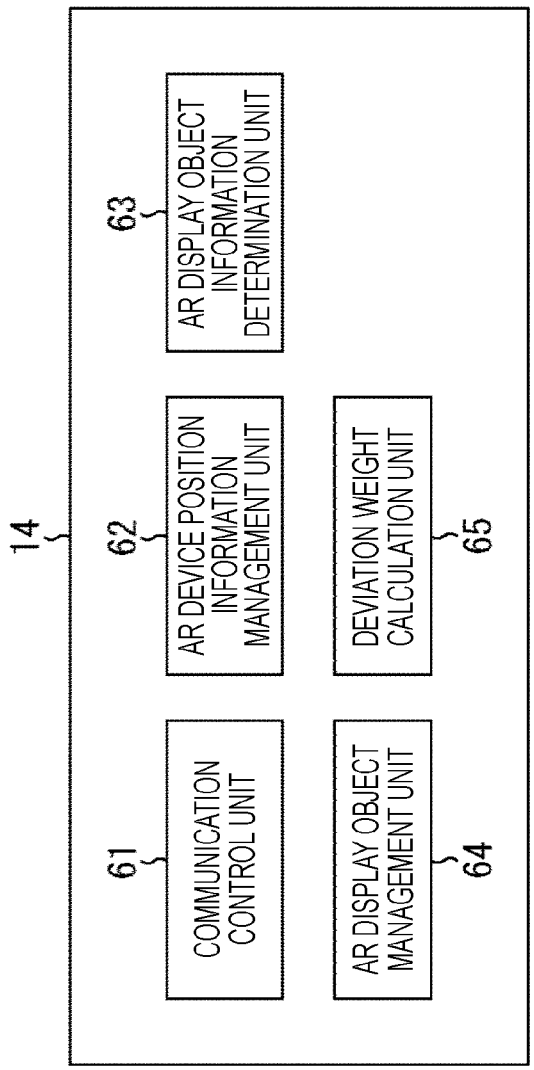
FIG. 4 is a block diagram illustrating a functional configuration example of a server.

FIG. 4 is a block diagram illustrating a configuration example of the server 14.

As illustrated in FIG. 4, the server 14 includes a communication control unit 61, an AR device position information management unit 62, an AR display object information determination unit 63, an AR display object management unit 64, and a deviation weight calculation unit 65.

The communication control unit 61 communicates with a plurality of AR devices 13 through the network 12. For example, the communication control unit 61 acquires AR device position information transmitted from the plurality of AR devices 13 and supplies the AR device position information to the AR device position information management unit 62, and transmits AR display object information to the plurality of AR devices 13.

The AR device position information management unit 62 manages the AR device position information of all the AR devices 13 acquired by the communication control unit 61, and constantly updates the AR device position information to the latest AR device position information.

The AR display object information determination unit 63 determines a deviation weight calculated by the deviation weight calculation unit 65. For example, a deviation weight is an evaluation value indicating how easily a plurality of users recognizes that the arrangement position of the AR object 15 is deviated from each other. Then, the AR display object information determination unit 63 determines AR display object information according to the deviation weight, and supplies the AR display object information to the communication control unit 61 and the AR display object management unit 64. For example, in a case where the deviation weight is large, that is, in a case where a plurality of users can easily recognize the deviation of the AR object 15 from each other, the AR display object information determination unit 63 adjusts the display method of the AR object 15 so that the deviation weight becomes small, and determines the AR display object information.

That is, the AR display object information determination unit 63 can reduce the deviation weight by adjusting the display method (e.g., arrangement position, size, visual effect, and the like) of the AR object 15, and determine the AR display object information that makes it difficult for a plurality of users to recognize the deviation of the AR object 15 when the AR object 15 is displayed. For example, the deviation weight can be reduced by moving the arrangement position of the AR object 15 away from the plurality of users or adjusting the size of the AR object 15 so that the AR object 15 looks larger. Alternatively, the deviation weight can also be reduced by adjusting the visual effect for the AR object 15 so that the region where the AR object 15 is present is ambiguous. Note that a processing example of adjusting the display of the AR object 15 will be described later with reference to FIGS. 6A, 6B, 6C, 6D, 7, 8, 9, 10, 11A, 11B, 12A, and 12B.

The AR display object management unit 64 manages the AR display object information determined by the AR display object information determination unit 63, and constantly updates the AR display object information to the latest AR display object information.

The deviation weight calculation unit 65 calculates a deviation weight on the basis of the AR device position information of the first AR device 13A, the AR device position information of the second AR device 13B, and the latest AR display object information managed by the AR display object management unit 64. Note that a method of calculating the deviation weight will be described later with reference to FIGS. 6A, 6B, 6C, 6D, 7, 8, 9, and 10.

<AR Object Display Adjustment Processing>

Figure 5:
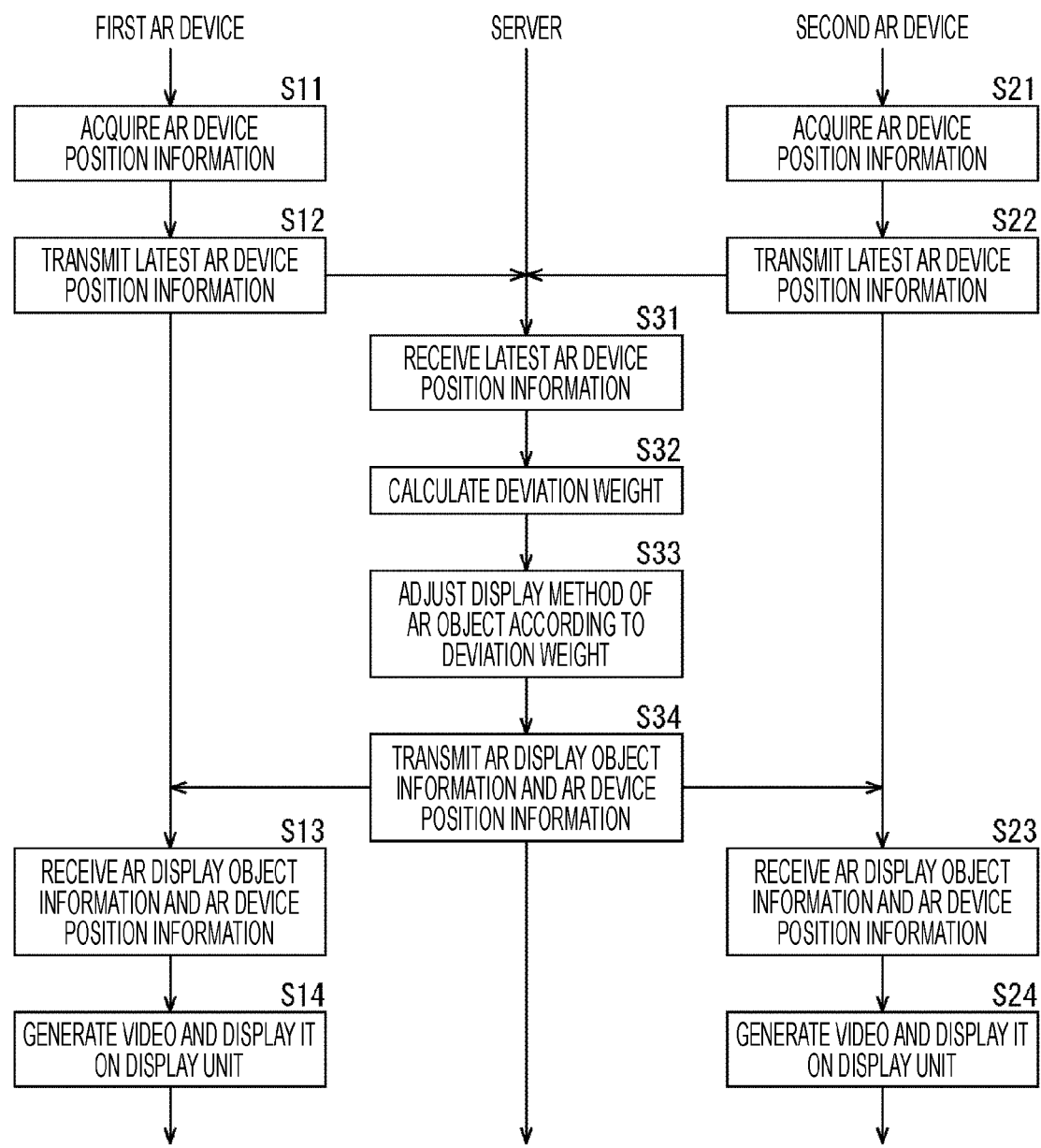
FIG. 5 is a flowchart for describing AR object display adjustment processing.

AR object display adjustment processing performed in the AR system 11 will be described with reference to the flowchart illustrated in FIG. 5. For example, the AR object display adjustment processing illustrated in FIG. 5 is repeatedly performed at a predetermined cycle while the AR object 15 is displayed.

In step S11, in the first AR device 13A, the AR device position information acquisition unit 52 acquires the AR device position information of the first AR device 13A and supplies the AR device position information to the AR device position information management unit 53. Then, the AR device position information management unit 53 updates the AR device position information to the latest AR device position information.

Similarly, in step S21, in the second AR device 13B, the AR device position information of the second AR device 13B is acquired to update the AR device position information to the latest AR device position information.

In step S12, in the first AR device 13A, the communication control unit 51 reads the latest AR device position information regarding the first AR device 13A from the AR device position information management unit 53A, and transmits the information to the server 14 through the network 12.

Similarly, in step S22, in the second AR device 13B, the latest AR device position information regarding the second AR device 13B is transmitted to the server 14.

In step S31, in the server 14, the communication control unit 61 receives the latest AR device position information regarding the first AR device 13A transmitted in step S12 and the latest AR device position information regarding the second AR device 13B transmitted in step S22. Then, the communication control unit 61 supplies each piece of the latest AR device position information to the AR device position information management unit 62, and the AR device position information management unit 62 updates all the AR device position information to the latest AR device position information.

In step S32, in the server 14, the deviation weight calculation unit 65 reads the latest AR device position information regarding the first AR device 13A and the latest AR device position information regarding the second AR device 13B from the AR device position information management unit 62. Then, the deviation weight calculation unit 65 calculates the deviation weight on the basis of the latest AR device position information and the latest AR display object information read from the AR display object management unit 64, and supplies the deviation weight to the AR display object information determination unit 63.

In step S33, in the server 14, the AR display object information determination unit 63 adjusts the display method of the AR object 15 so that the deviation weight decreases, according to the deviation weight calculated by the deviation weight calculation unit 65 in step S32. Then, the AR display object information determination unit 63 determines the AR display object information indicating the display position and the like of the AR object 15 to achieve the display method after adjustment, and supplies the AR display object information to the AR display object management unit 64 and the communication control unit 61. As a result, the AR display object management unit 64 updates the AR display object information to the latest AR display object information.

In step S34, in the server 14, the communication control unit 61 transmits the AR display object information determined by the AR display object information determination unit 63 in step S33 to the first AR device 13A and the second AR device 13B through the network 12. At that time, the communication control unit 61 transmits the latest AR device position information regarding the first AR device 13A managed by the AR device position information management unit 62 to the second AR device 13B, and transmits the latest AR device position information regarding the second AR device 13B to the first AR device 13A.

In step S13, in the first AR device 13A, the communication control unit 51 receives the latest AR device position information regarding the second AR device 13B together with the AR display object information transmitted from the server 14 in step S34. Then, the communication control unit 51 supplies the AR display object information to the output video generation unit 54, and supplies the latest AR device position information regarding the second AR device 13B to the AR device position information management unit 53 for update.

Similarly, in step S23, the second AR device 13B receives the latest AR device position information regarding the first AR device 13A together with the AR display object information.

In step S14, in the first AR device 13A, the output video generation unit 54 generates a video representing the AR object 15 according to the AR display object information supplied from the communication control unit 51 in step S13 and the latest AR device position information managed in the AR device position information management unit 53. Then, the video generated by the output video generation unit 54 is displayed on the display units 37R and 37L under the control of the output video control unit 55.

Similarly, in step S24, the second AR device 13B generates a video representing the AR object 15 and displays the video on the display units 37R and 37L.

Thereafter, the processing returns to steps S11, S21, and S31, and similar processing is repeatedly performed thereafter.

As described above, the AR system 11 calculates the deviation weight even in a use environment with a plurality of users, and in a case where the deviation weight is large, adjusts the display method of the AR object 15 so as to reduce the deviation weight. As a result, the AR system 11 can keep each user from feeling a strangeness regarding augmented reality, and the user can enjoy the augmented reality more.

<First Processing Example of AR Object Display Adjustment Processing>

A first processing example of adjusting the display of the AR object 15 according to the deviation weight will be described with reference to FIGS. 6A, 6B, 6C, 6D, 7, and 8.

First, with reference to FIGS. 6A, 6B, 6C, and 6D, the ease of recognizing occurrence of deviation in the arrangement position of the AR object 15 for the user of the first AR device 13A and the user of the second AR device 13B will be described. For example, the ease of recognizing the deviation differs depending on the positional relationship according to the distance from the user of the first AR device 13A to the arrangement position of an AR object 15A presented by the first AR device 13A and the distance from the user of the second AR device 13B to the arrangement position of an AR object 15B presented by the second AR device 13B.

Figure 6A:
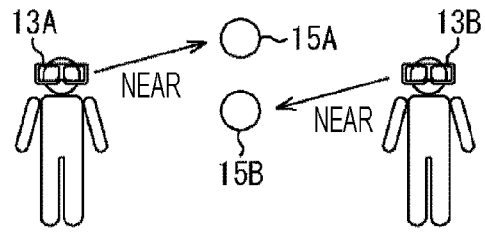
FIGS. 6A, 6B, 6C, and 6D are diagrams for describing ease of recognizing that a deviation has occurred in arrangement positions of AR objects.

First, as illustrated in FIG. 6A, a first positional relationship in which the distance from the user of the first AR device 13A to the arrangement position of the AR object 15A is short and the distance from the user of the second AR device 13B to the arrangement position of the AR object 15B is short will be described. In such a first positional relationship, since the two users are close to each other, when a deviation occurs in the arrangement positions of the AR object 15A and the AR object 15B, the users can easily recognize that they are looking in different directions. Accordingly, in the first positional relationship, it is easy for the users to recognize that a deviation has occurred in the arrangement position of the AR object 15.

Figure 6B:
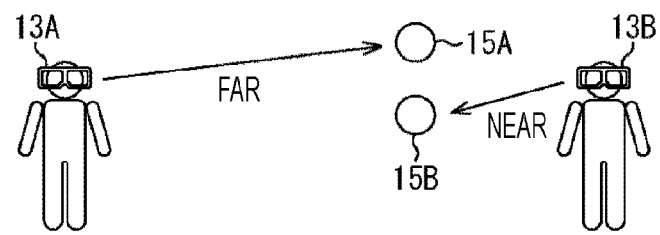

Furthermore, as illustrated in FIG. 6B, a second positional relationship in which the distance from the user of the first AR device 13A to the arrangement position of the AR object 15A is long and the distance from the user of the second AR device 13B to the arrangement position of the AR object 15B is short will be described. In such a second positional relationship, since the two users are far from each other, even if a deviation occurs in the arrangement positions of the AR object 15A and the AR object 15B, the users cannot easily recognize that they are looking in different directions. Accordingly, in the second positional relationship, it is difficult for the users to recognize that a deviation has occurred in the arrangement position of the AR object 15.

Figure 6C:
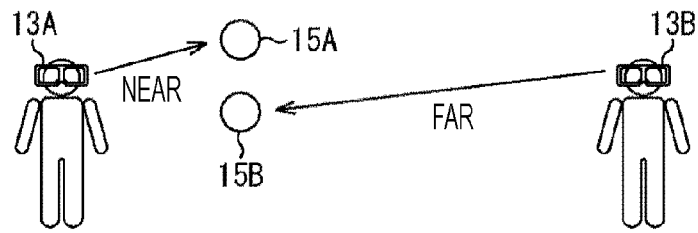

Furthermore, as illustrated in FIG. 6C, a third positional relationship in which the distance from the user of the first AR device 13A to the arrangement position of the AR object 15A is short and the distance from the user of the second AR device 13B to the arrangement position of the AR object 15B is long will be described. In such a third positional relationship, since the two users are far from each other, even if a deviation occurs in the arrangement positions of the AR object 15A and the AR object 15B, the users cannot easily recognize that they are looking in different directions. Accordingly, in the third positional relationship, it is difficult for the users to recognize that a deviation has occurred in the arrangement position of the AR object 15.

Figure 6D:
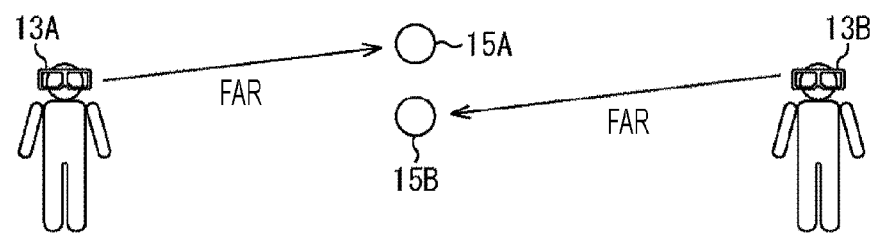

Furthermore, as illustrated in FIG. 6D, a fourth positional relationship in which the distance from the user of the first AR device 13A to the arrangement position of the AR object 15A is long and the distance from the user of the second AR device 13B to the arrangement position of the AR object 15B is long will be described. In such a fourth positional relationship, since the two users are far from each other, even if a deviation occurs in the arrangement positions of the AR object 15A and the AR object 15B, the users cannot easily recognize that they are looking in different directions. Accordingly, in the fourth positional relationship, it is difficult for the users to recognize that a deviation has occurred in the arrangement position of the AR object 15.

As described above, the ease of recognizing the deviation differs depending on the positional relationship according to the distance from the user of the first AR device 13A to the arrangement position of the AR object 15A and the distance from the user of the second AR device 13B to the arrangement position of the AR object 15B.

Hence, in the case of the first positional relationship as illustrated in FIG. 6A, the arrangement position of the AR object 15A is adjusted so as to elongate the distance from the user of the first AR device 13A to the arrangement position of the AR object 15A or to elongate the distance from the user of the second AR device 13B to the arrangement position of the AR object 15B. As a result, it is possible to make it difficult for the users to recognize that a deviation has occurred in the arrangement position of the AR object 15.

Accordingly, the deviation weight is set such that the value increases as the distance from the user of the first AR device 13A to the arrangement position of the AR object 15A decreases and the distance from the user of the second AR device 13B to the arrangement position of the AR object 15B decreases. As a result, by adjusting the distances so as to reduce the deviation weight, it is possible to make it difficult for each user to recognize that a deviation has occurred in the arrangement position of the AR object 15.

Specifically, a deviation weight W can be obtained according to the following Formula (1) using, for example, a distance Da from the first AR device 13A to the AR object 15A, a distance Db from the second AR device 13B to the AR object 15B, and a weight coefficient α.

[Expression 1]

$$W = \frac{1}{Da + Db} \times \alpha \tag{1}$$

Then, as the deviation weight W indicated in the equation (1) approaches 0, it becomes difficult for each user to recognize that a deviation has occurred in the arrangement position of the AR object 15. On the other hand, as the deviation weight W indicated in the equation (1) approaches 1, it becomes easier for each user to recognize that a deviation has occurred in the arrangement position of the AR object 15.

Accordingly, in a case where the deviation weight W calculated by the deviation weight calculation unit 65 is close to 1, the AR display object information determination unit 63 in FIG. 4 determines the AR display object information so that the distance Da from the first AR device 13A to the AR object 15A and the distance Db from the second AR device 13B to the AR object 15B increase.

Figure 7:
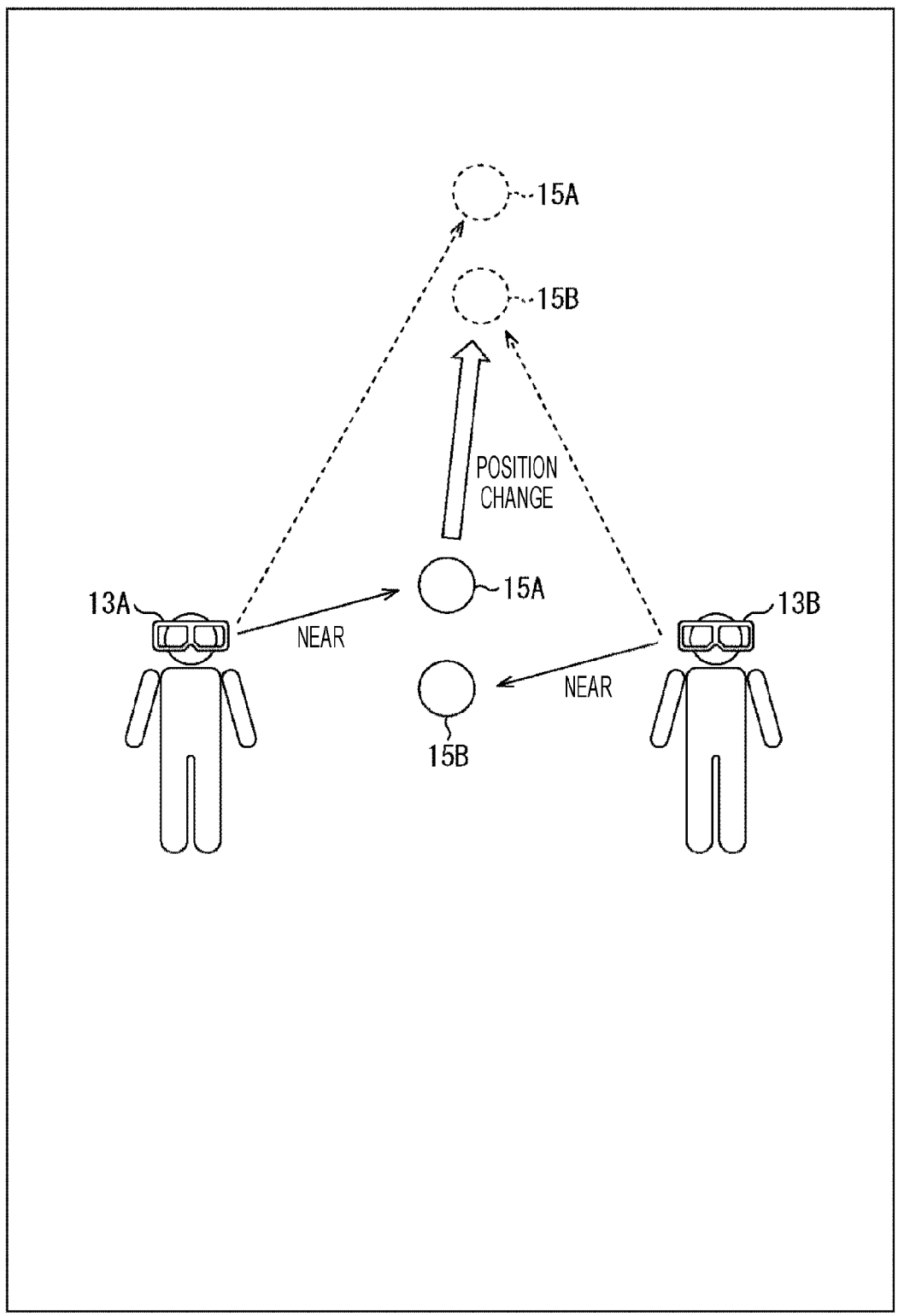
FIG. 7 is a diagram for describing a first processing example of AR object display adjustment processing.

That is, as indicated by a white arrow in FIG. 7, the arrangement positions of the AR objects 15A and 15B are changed so as to elongate the distance from the first AR device 13A to the AR object 15A and to elongate the distance from the second AR device 13B to the AR object 15B.

Then, for example, in step S32 of FIG. 5, the deviation weight calculation unit 65 calculates the deviation weight according to the above-described equation (1). Thereafter, in step S33, the AR display object information determination unit 63 determines the AR display object information indicating the arrangement positions of the AR objects 15A and 15B by adjusting the arrangement positions of the AR objects 15A and 15B to be distant until the deviation weight W becomes equal to or less than a predetermined threshold.

Note that, specifically, when an added value (Da+Db) of the distance Da and the distance Db becomes equal to or more than 10 m, it is assumed that it becomes difficult for the users to recognize the direction in which they are looking at each other. Accordingly, when the added value (Da+Db) of the distance Da and the distance Db is less than 10 m, the processing of adjusting the display of the AR object 15 may be performed. That is, when the deviation weight W is larger than 0.1, the display of the AR object 15 is adjusted. On the other hand, when the deviation weight W is 0.1 or less, it is considered that the users are sufficiently separated from each other, and the display of the AR object 15 does not need to be adjusted.

Here, the logic of adjusting the arrangement position of the AR object 15 and setting a new target position will be further described with reference to FIG. 8.

Figure 8:
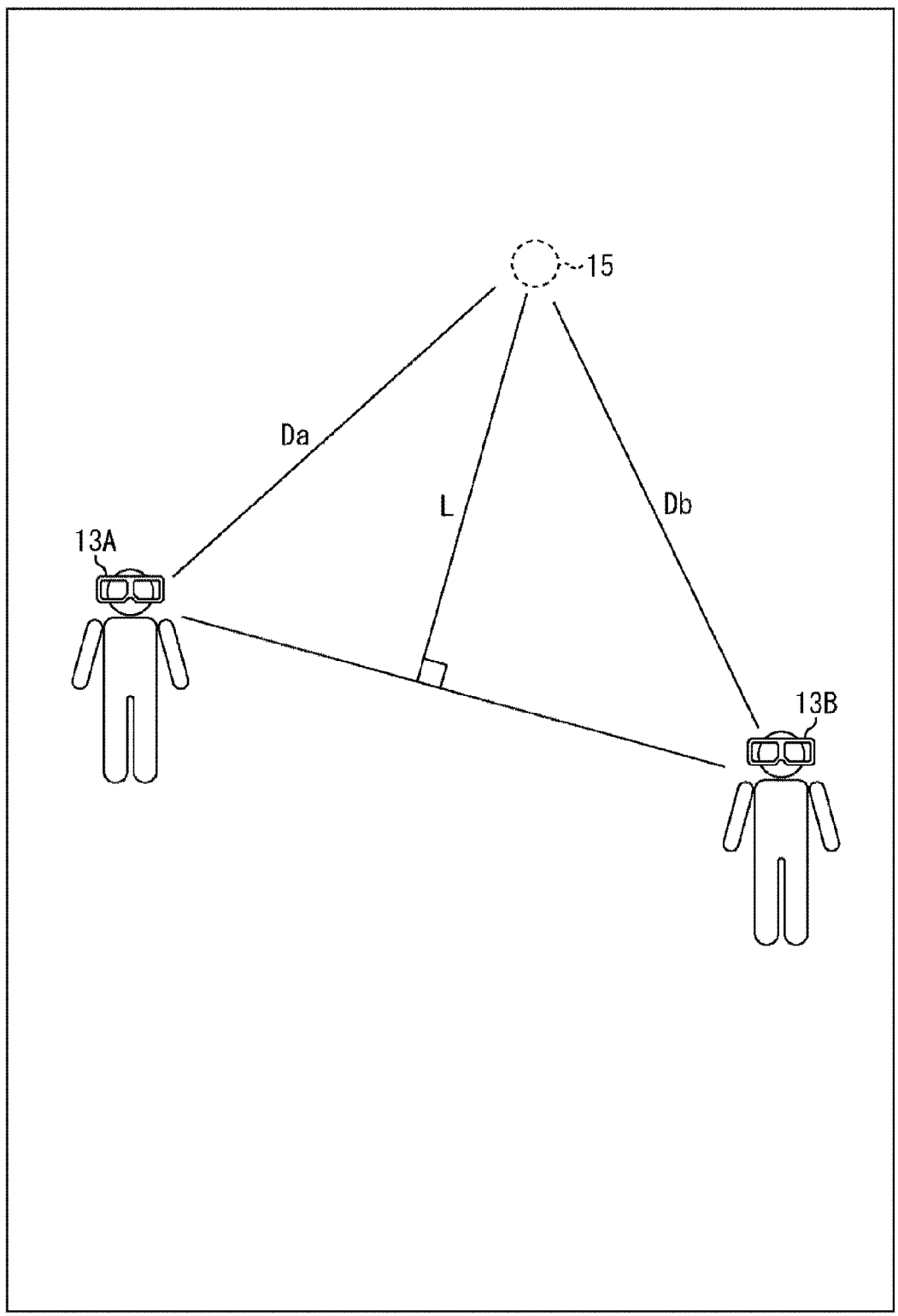
FIG. 8 is a diagram for describing adjustment of an arrangement position of an AR object.

As illustrated in FIG. 8, a distance L of the AR object 15 is set at the time of changing the arrangement position of the AR object 15 from a straight line connecting the first AR device 13A and the second AR device 13B along a direction perpendicular to the straight line. Then, if the arrangement position of the AR object 15 is changed so that the distance L from the straight line increases, the deviation weight W decreases as the distance Da and the distance Db increase.

Accordingly, for example, by adjusting and changing the arrangement position of the AR object 15 along the direction perpendicular to the straight line so as to increase the distance L until the deviation weight W is equal to or less than a predetermined threshold, it is possible to make it difficult for each user to recognize that a deviation has occurred in the arrangement position of the AR object 15.

Note that, at this time, positions recognized by the server 14 are used as the arrangement position of the AR object 15, the position of the first AR device 13A, and the position of the second AR device 13B.

<Second Processing Example of AR Object Display Adjustment Processing>

A second processing example of adjusting the display of the AR object 15 according to the deviation weight will be described with reference to FIGS. 9 and 10.

Figure 9:
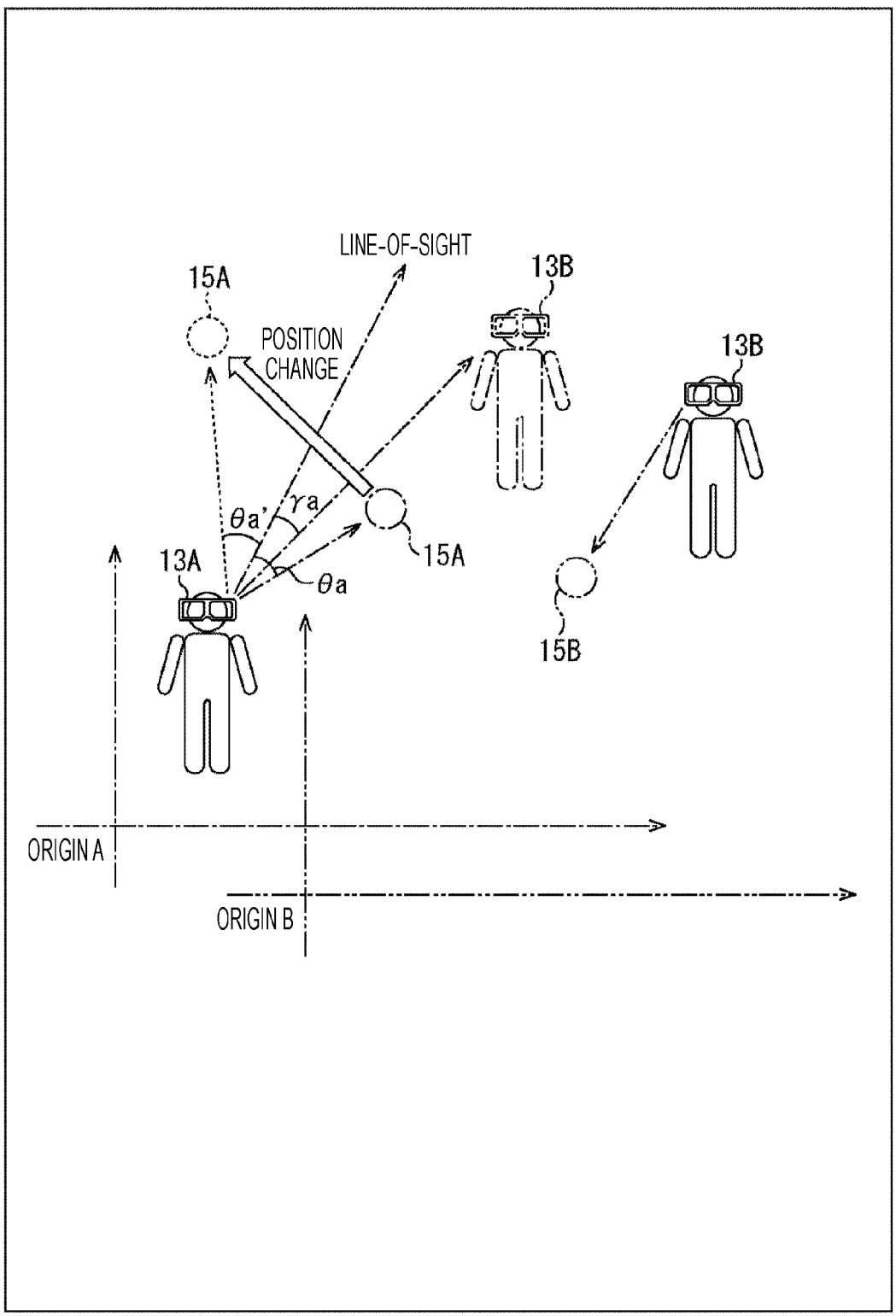
FIG. 9 is a diagram for describing a second processing example of the AR object display adjustment processing.

For example, FIG. 9 illustrates a state in which the user of the first AR device 13A is facing the direction of the AR object 15A and the user of the second AR device 13B is facing the direction of the AR object 15B. In such a state, each user can easily recognize that the other user is not looking in the direction of the AR object 15 that the user is looking. Hence, each user can easily recognize that a deviation has occurred in the arrangement position of the AR object 15.

Furthermore, in FIG. 9, each of the user of the first AR device 13A indicated by a solid line and the user of the second AR device 13B indicated by a solid line represents a self position in the real world. Furthermore, the coordinate system, the direction of the line-of-sight and the like, the AR object 15A, and the user of the second AR device 13B indicated by the one-dot chain line are represented on the basis of an origin A serving as the reference of the first AR device 13A. Furthermore, the coordinate system, the direction of the line-of-sight and the like, and the AR object 15B indicated by the two-dot chain line are represented on the basis of an origin B serving as the reference of the second AR device 13B.

Then, as illustrated in FIG. 9, according to the deviation occurring between the origin A of the first AR device 13A and the origin B of the second AR device 13B, a deviation occurs between the arrangement position of the AR object 15A and the arrangement position of the AR object 15B with respect to the real world. When a deviation occurs in this manner, for example, if the user of the second AR device 13B points in the direction of the AR object 15B that the user himself/herself is viewing, the user points in a direction different from the AR object 15A that the user of the first AR device 13A is viewing. Accordingly, in such a case, the user of the first AR device 13A clearly recognizes that a deviation has occurred in the arrangement position of the AR object 15.

Here, in order for a certain user to grasp the position of another user, it is considered that there are the following two grasping methods.

In a first grasping method, the AR device 13 of a certain user receives the self position recognized by the AR device 13 of another user, and can grasp the position of the another user on the basis of the coordinate information indicated by the self position. In this case, when a deviation occurs at the origin of each AR device 13, there may be a slight deviation in the sense of direction of the AR device 13. However, the AR device 13 can calculate the deviation weight from the coordinate information indicated by the received self position.

In a second grasping method, it is possible to grasp the position of another user by using videos captured by the imaging units 38R and 38L of the AR device 13 and calculating the coordinates of the another user captured in the videos.

With these two types of grasping methods, the AR devices 13 of the users can mutually grasp the positions of the AR devices 13 of the other users.

Then, as illustrated in FIG. 9, an angle θa between the direction of the line-of-sight of the user of the first AR device 13A and the direction from the user of the first AR device 13A toward the AR object 15A and an angle γa between the direction of the line-of-sight of the user of the first AR device 13A and the direction from the user of the first AR device 13A toward the user of the second AR device 13B are set.

Moreover, it is assumed that the user of the first AR device 13A can view the AR object 15A within a range from an angle of view −v to an angle of view v according to an angle of view v at which the first AR device 13A can display the AR object 15A. That is, when the angle θa exceeds the angle of view v, the user of the first AR device 13A cannot see the AR object 15A.

Accordingly, a deviation weight Wa for the user of the first AR device 13A is divided into cases according to the magnitude relationship between the angle of view v and the angle θa, and can be obtained as shown in the following equation (2) using the angle θa, the angle γa, and a weighting coefficient α. For example, as indicated in equation (2), in a case where the angle θa is out of the range of the angle of view v, the deviation weight Wa is obtained as 0.

[Expression 2]

$$\begin{cases} Wa = \dfrac{1}{|\theta a - \gamma a|} \times \alpha & (-v < \theta a < v) \\ Wa = 0 & (\theta a < -v, v < \theta a) \end{cases} \quad (2)$$

Note that, similarly to the equation (2), a deviation weight Wb for the user of the second AR device 13B is also divided into cases according to the magnitude relationship between the angle of view v and an angle θb, and can be obtained using the angle θb, an angle γb, and the weighting coefficient α. Here, the angle θb is the angle between the direction of the line-of-sight of the user of the second AR device 13B and the direction from the user of the second AR device 13B toward the AR object 15B, and the angle γb is the angle between the direction of the line-of-sight of the user of the second AR device 13B and the direction from the user of the second AR device 13B toward the user of the first AR device 13A.

Then, as the deviation weight Wa indicated in the equation (2) approaches 0, it becomes more difficult for the user of the first AR device 13A to recognize that a deviation has occurred in the arrangement positions of the AR objects 15A and 15B. On the other hand, as the deviation weight Wa indicated in the equation (2) approaches 1, it becomes easier for the user of the first AR device 13A to recognize that a deviation has occurred in the arrangement positions of the AR objects 15A and 15B.

Accordingly, in a case where the deviation weight is close to 1, the arrangement position of the AR object 15 is changed as indicated by a white arrow in FIG. 9. By adjusting the angle θa to the angle θa' so as to increase accordingly, the deviation weight Wa can be reduced.

For example, in a case where the horizontal angle of view v of the first AR device 13A is 40 degrees, if the absolute value of the difference between the angle θa and the angle γa exceeds 40 degrees, there is a high possibility that the user does not notice the deviation in the arrangement positions of the AR objects 15A and 15B. Accordingly, when the absolute value of the difference between the angle θa and the angle γa is less than 40 degrees and the deviation weight Wa is larger than 1/40, processing of adjusting the display of the AR object 15A is performed.

Then, for example, in step S32 of FIG. 5, the deviation weight calculation unit 65 calculates the deviation weight according to the above-described equation (2). Thereafter, in step S33, the AR display object information determination unit 63 determines the AR display object information indicating the arrangement position of the AR object 15A by adjusting and increasing the angle θa until the deviation weight Wa becomes equal to or less than the predetermined threshold.

Note that when the angle θa and the angle γa match (θa=γa), the deviation weight Wa is 1.

Here, the logic of changing the arrangement position of the AR object 15 and setting a new target position will be further described with reference to FIG. 10.

Figure 10:
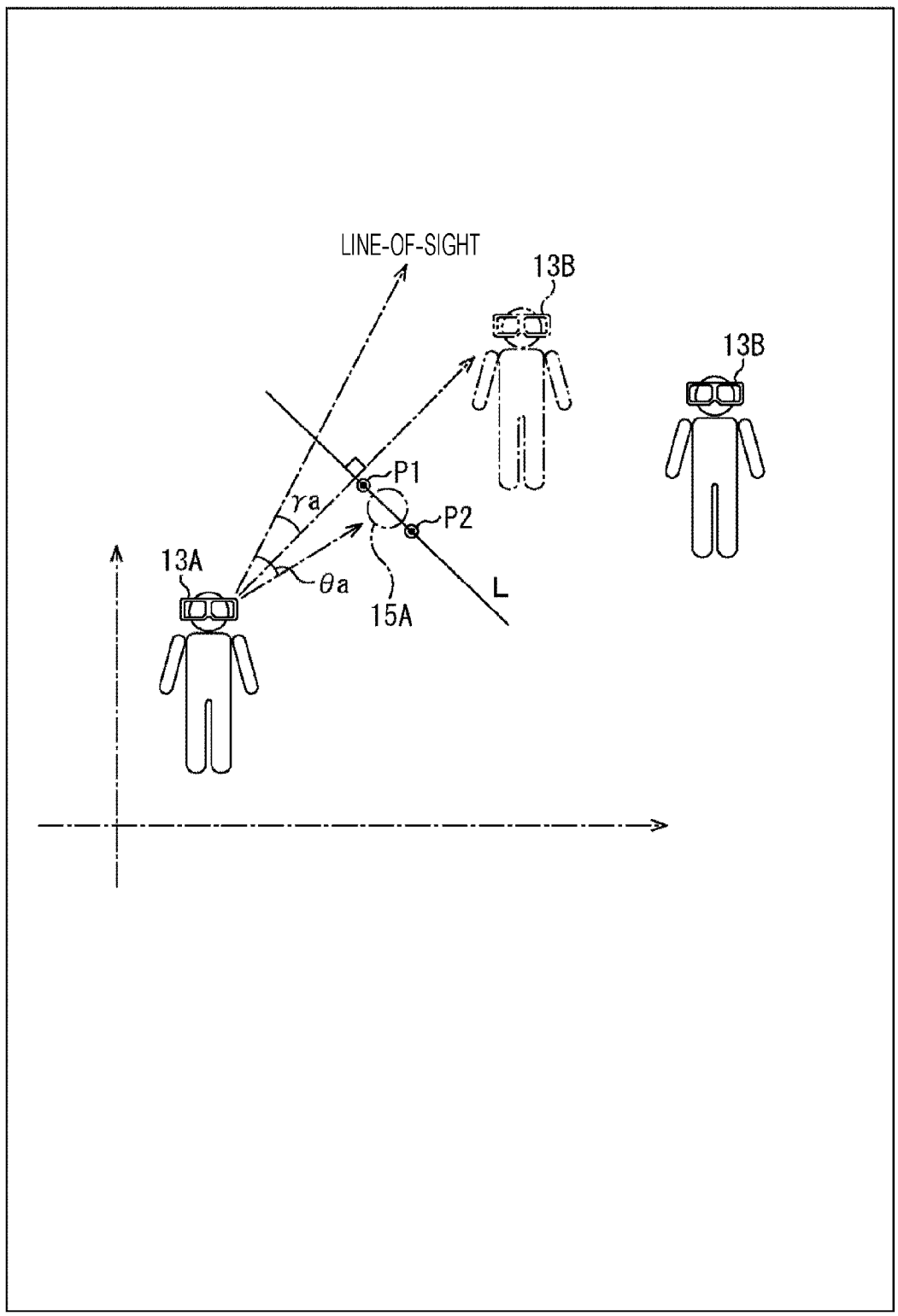
FIG. 10 is a diagram for describing adjustment of an arrangement position of an AR object.

For example, as illustrated in FIG. 10, a straight line L passing through the arrangement position of the AR object 15A is set along a direction perpendicular to the straight line from the first AR device 13A to the second AR device 13B. Then, the deviation weight Wa at two points P1 and P2 on the straight line L separated at a predetermined interval (e.g., 10 cm) in the left-right direction of the AR object 15A is calculated, and the AR object 15A is moved in a direction in which the deviation weight Wa decreases. In the example illustrated in FIG. 10, the deviation weight Wa can be made smaller by moving the AR object 15A in the direction of the point P2 than in the direction of the point P1.

<Other Processing Example of Adjusting Display of AR Object>

As described above, in addition to reducing the deviation weight by adjusting the arrangement position of the AR object 15, for example, the deviation weight can also be reduced by adjusting the size or visual effect of the AR object 15.

The processing of adjusting the size of the AR object 15 so as to reduce the deviation weight will be described with reference to FIGS. 11A and 11B.

As illustrated in FIG. 11A, in a case where the size of the AR objects 15A and 15B is small and a deviation occurs in the arrangement positions to such an extent that they do not overlap each other, the user of the first AR device 13A and the user of the second AR device 13B can easily recognize that the deviation has occurred in the arrangement positions of the AR objects 15A and 15B. In this case, as illustrated in FIG. 11B, by adjusting and increasing the size of the AR objects 15A and 15B, even if a deviation occurs in the arrangement positions of the AR objects 15A and 15B, the AR objects 15A and 15B can be superimposed on one another. As a result, the user of the first AR device 13A and the user of the second AR device 13B also look at the part where the AR objects 15A and 15B overlap, and it becomes difficult to recognize that a deviation has occurred in the arrangement positions of the AR objects 15A and 15B.

In this case, it is necessary to consider the size of the AR object 15 in addition to the distance as described above to determine the deviation weight W. For example, the deviation weight W can be obtained according to the following equation (3) using a size S of the AR objects 15A and 15B and the weight coefficient α. Note that, as the unit of the size S of the AR objects 15A and 15B, the meter unit of the real space, the scale value in the AR space, and the like are used according to assets such as models and textures of the AR objects 15A and 15B.

[Expression 3]

$$W = \frac{1}{S} \times \alpha \qquad (3)$$

Similarly to the above-described equation (1), as the deviation weight W indicated in the equation (3) approaches 0, it becomes difficult for each user to recognize that a deviation has occurred in the arrangement position of the AR object 15. On the other hand, as the deviation weight W indicated in the equation (3) approaches 1, it becomes easier for each user to recognize that a deviation has occurred in the arrangement position of the AR object 15.

Accordingly, in a case where the deviation weight W calculated by the deviation weight calculation unit 65 is close to 1, for example, when the deviation weight W is equal to or greater than a predetermined threshold, the AR display object information determination unit 63 of FIG. 4 determines the AR display object information such that the size S of the AR objects 15A and 15B increases and the deviation weight W becomes equal to or less than the predetermined threshold. It goes without saying that adjustments may be made to obtain a more appropriate distance L and size S in consideration of a balance between the deviation weight W obtained by the above-described equation (1) and the deviation weight W obtained by the equation (3).

In this way, by adjusting the size of the AR object 15, it is possible to make it difficult for the users to recognize that a deviation has occurred in the arrangement position of the AR object 15.

Figure 12A:
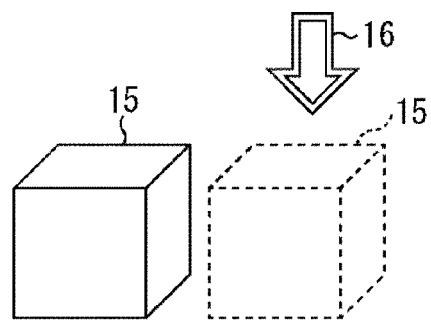
FIGS. 12A and 12B are diagrams for explaining adjustment of a visual effect of an AR object.
Figure 12B:
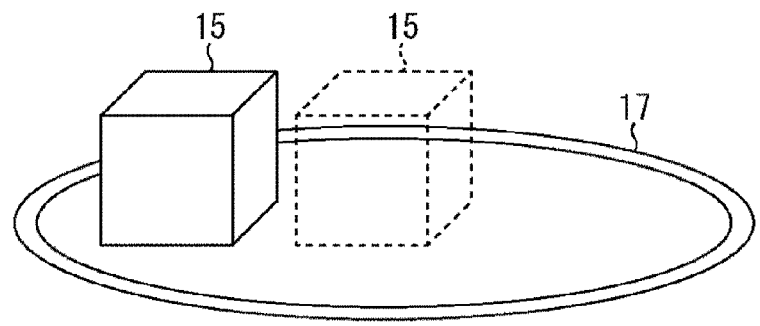

With reference to FIGS. 12A and 12B, the processing of changing a visual effect on the AR object 15 to make it difficult to recognize that a deviation has occurred in the arrangement position of the AR object 15 will be described. In FIGS. 12A and 12B, the original arrangement position of the AR object 15 is indicated by a broken line, and the AR object 15 is arranged in a position deviated from the original arrangement position.

For example, as the visual effect for the AR object 15, a display method of expressing the AR object 15 in a precise manner using a marker indicating the arrangement position of the AR object 15 and a display method of expressing the AR object 15 in an ambiguous manner can be selectively used.

As the display method of expressing the AR object 15 in a precise manner, as illustrated in FIG. 12A, an arrow-shaped marker 16 can be used to pinpoint the AR object 15. On the other hand, as the display method of representing the AR object 15 in an ambiguous manner, as illustrated in FIG. 12B, a circular marker 17 that roughly represents a predetermined range including the AR object 15 can be used. In the example illustrated in FIGS. 12A and 12B, the arrow-shaped marker 16 pinpoints the original arrangement position of the AR object 15, and the circular marker 17 is centered on the original arrangement position of the AR object 15.

Then, in a case where it is determined that the deviation weight W obtained by the equation (1), equation (2), or another method as described above is equal to or more than a predetermined threshold, the display method of expressing the AR object 15 in a precise manner can be changed to the display method of expressing the AR object 15 in an ambiguous manner. Thus, it is possible to make it difficult for the user to recognize that a deviation has occurred in the arrangement position of the AR object 15. In other words, by changing the visual effect for the AR object 15 to use an ambiguous display method that roughly represents the arrangement position of the AR object 15, it becomes difficult to recognize that a deviation has occurred in the arrangement position of the AR object 15.

As described above, by adjusting the arrangement position, size, visual effect, and the like as a method of displaying the AR object 15, the AR system 11 can keep the user from recognizing that a deviation has occurred in the arrangement position of the AR object 15, and allow him/her to enjoy the augmented reality more. Note that other display methods may be adjusted as long as the deviation weight can be reduced.

Here, the way of setting the threshold and numerical examples of the threshold will be described.

For example, 1 is basically used as the weighting coefficient $\alpha$ used in the above-described equations (1) to (3). The present invention is not limited thereto, and the weight coefficient $\alpha$ can be freely determined. Then, in a case where the weighting coefficient $\alpha$ is 1, the threshold can be freely determined in a range of 0 to 1.

Note that it is known that the magnitude of the deviation in the arrangement position of the AR object 15 described in the present embodiment is, for example, in a range of about several mm to 1 m. Hence, how sensitive the processing of adjusting the display of the AR object 15 is to the magnitude of the deviation can be appropriately set according to the shape and size of the AR object 15, the scenario when the AR object 15 is displayed, and the like.

Incidentally, it is assumed that the AR device 13 uses a small mobile terminal and does not have high-performance processing capability. Hence, it is preferable to change the processing load of the CPU 34 (or graphics processing unit (GPU) (not illustrated)) for displaying the AR object 15 on the basis of the peripheral situation of the AR device 13 and information indicating the position and orientation of the imaging unit 38. As a result, it is possible to reduce the processing load while keeping the user wearing the AR device 13 from recognizing the feeling of strangeness.

Note that, in addition to displaying the video representing the AR object 15, the AR device 13 may be configured to project a video representing the AR object 15 or show the AR object 15 to the user by another output method. Furthermore, the processing of adjusting the display method of the AR object 15 according to the deviation weight is not limited to the above-described processing example.

<Computer Configuration Example>

Next, the above-described series of processing (information processing method) can be performed by hardware or software. In a case where the series of processing is performed by software, a program that is included in the software is installed on a general-purpose computer or the like.

Figure 13:
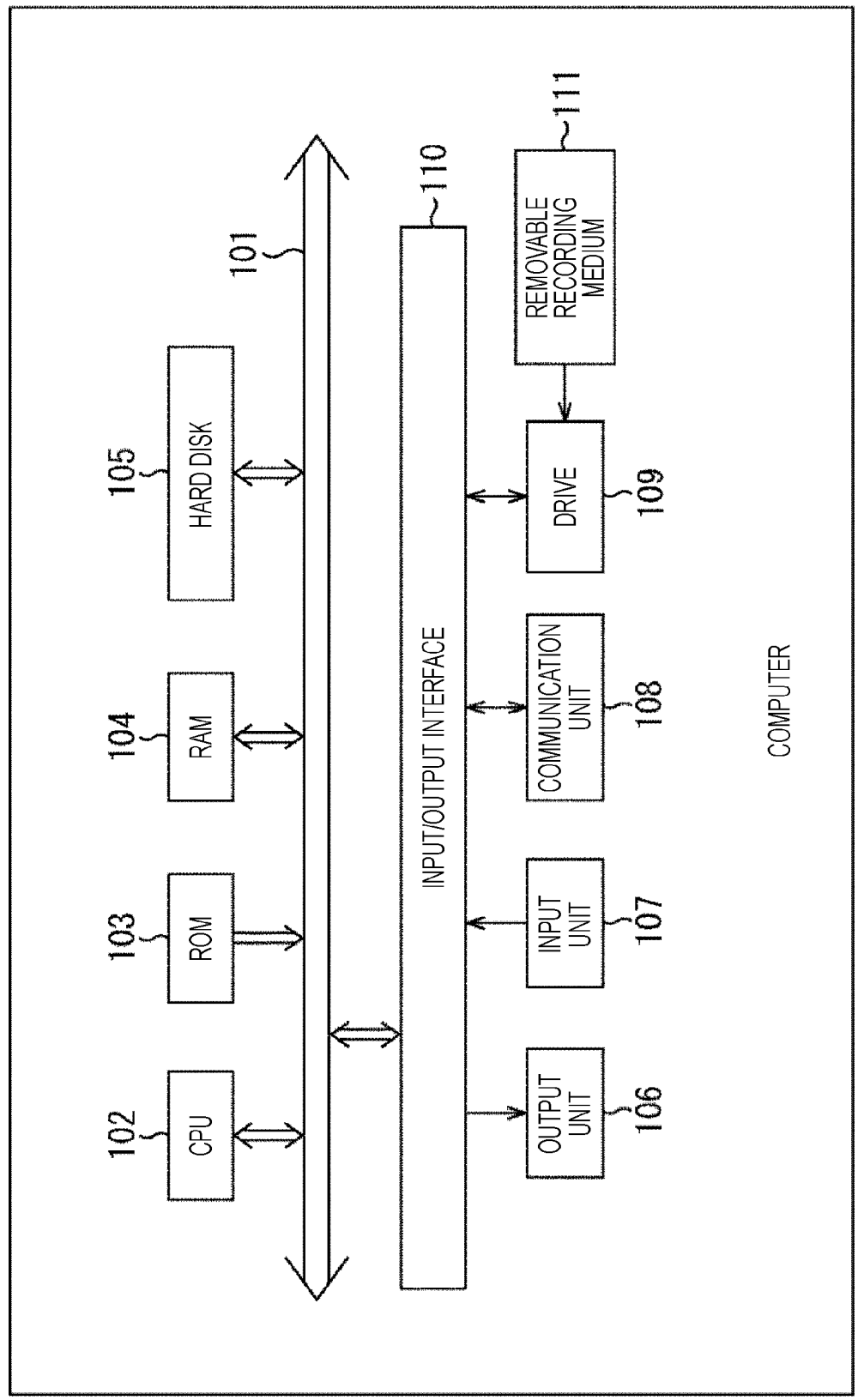
FIG. 13 is a block diagram illustrating a configuration example of an embodiment of a computer to which the present technology is applied.

FIG. 13 is a block diagram illustrating a configuration example of an embodiment of a computer on which a program for executing the above-described series of processing is installed.

The program can be recorded in advance in a hard disk 105 or a ROM 103 as a recording medium built in the computer.

Alternatively, the program can be stored (recorded) in a removable recording medium 111 driven by a drive 109. Such a removable recording medium 111 can be provided as so-called package software. Here, examples of the removable recording medium 111 include a flexible disk, a compact disc read only memory (CD-ROM), a magneto optical (MO) disk, a digital versatile disc (DVD), a magnetic disk, a semiconductor memory, and the like.

Note that the program can be installed on the computer from the removable recording medium 111 as described above, or can be downloaded to the computer through a communication network or a broadcast network and installed in the built-in hard disk 105. That is, for example, the program can be wirelessly transferred from a download site to the computer through an artificial satellite for digital satellite broadcasting, or can be transferred by wire to the computer through a network such as a local area network (LAN) or the Internet.

The computer incorporates a central processing unit (CPU) 102, and an input/output interface 110 is connected to the CPU 102 through a bus 101.

When a command is input by a user operating an input unit 107 or the like through the input/output interface 110, the CPU 102 executes a program stored in the read only memory (ROM) 103 according to the command. Alternatively, the CPU 102 loads the program stored in the hard disk 105 into a random access memory (RAM) 104 and executes the program.

As a result, the CPU 102 performs the processing according to the above-described flowchart or the processing performed by the configuration of the block diagram described above. Then, the CPU 102 performs control to output the processing result from an output unit 106 or transmit the processing result from a communication unit 108 through the input/output interface 110 as needed, for example, or record the processing result in the hard disk 105, for example.

Note that the input unit 107 includes a keyboard, a mouse, a microphone, and the like. Furthermore, the output unit 106 includes a liquid crystal display (LCD), a speaker, and the like.

Here, in the present specification, the processing performed by the computer according to the program is not necessarily performed in time series in the order described in the flowchart. That is, the processing performed by the computer according to the program also includes processing executed in parallel or individually (e.g., parallel processing or processing by object).

Furthermore, the program may be processed by one computer (processor) or may be processed in a distributed manner by a plurality of computers. Moreover, the program may be transferred to a remote computer to be executed.

Moreover, in the present specification, a system means a collection of a plurality of components (devices, modules (parts), and the like), and it does not matter whether or not all the components are in the same housing. Accordingly, a plurality of devices stored in separate housings and connected through a network, and one device storing a plurality of modules in one housing are both systems.

Furthermore, for example, a configuration described as one device (or processing unit) may be divided and formed as a plurality of devices (or processing units). Conversely, configurations described above as a plurality of devices (or processing units) may be collectively formed as one device (or processing unit). Furthermore, a configuration other than the above-described configuration may be added to the configuration of each device (or each processing unit). Furthermore, as long as the configuration and operation of the entire system are substantially the same, a part of the configuration of a certain device (or processing unit) may be included in the configuration of another device (or another processing unit).

Furthermore, for example, the present technology can have a cloud computing configuration in which one function is shared and processed by a plurality of devices through a network.

Furthermore, for example, the above-described program can be executed in an arbitrary device. In that case, it is sufficient that the device has a necessary function (functional block or the like) and can obtain necessary information.

Furthermore, each step described in the above-described flowchart can be executed by one device or be executed in a shared manner by a plurality of devices. Moreover, in a case where a plurality of processes is included in one step, the plurality of processes included in one step can be executed by one device or be executed in a shared manner by a plurality of devices. In other words, a plurality of processes included in one step can also be executed as processes of a plurality of steps. Conversely, processes described as a plurality of steps can be collectively executed as one step.

Note that, in the program executed by the computer, processing of steps describing the program may be executed in time series in the order described in the present specification, or may be executed in parallel or individually at a necessary timing such as when a call is made. That is, as long as there is no contradiction, the processing of each step may be executed in an order different from the above-described order. Moreover, the processing of steps describing this program may be executed in parallel with the processing of another program, or may be executed in combination with the processing of another program.

Note that a plurality of the present technologies described in the present specification can each be implemented independently as a single body as long as there is no contradiction. It goes without saying that a plurality of arbitrary present technologies can be implemented in combination. For example, some or all of the present technology described in any of the embodiments can be implemented in combination with some or all of the present technology described in other embodiments. Furthermore, some or all of the arbitrary present technology described above can be implemented in combination with other technologies not described above.

<Exemplar Combination of Configuration>

Note that the present technology can also be configured in the following manner.

(1)

An information processing device including:

a position information acquisition unit that acquires position information indicating a self position of an AR device that outputs an AR object shown to a user as if the AR object existed in real space by an augmented reality (AR) technology;

a weight calculation unit that calculates a deviation weight which is an evaluation value indicating how easily a plurality of users recognizes that an arrangement position of the AR object is deviated from each other on the basis of position information of a plurality of the AR devices and the arrangement position of the AR object; and an adjustment unit that adjusts an output method of the AR object according to the deviation weight to make it difficult to recognize occurrence of the deviation.

(2)

The information processing device according to (1) above, in which the weight calculation unit calculates the deviation weight whose value increases as a first distance from a first user to the AR object viewed by the first user decreases and a second distance from a second user to the AR object viewed by the second user decreases, and the adjustment unit changes the arrangement position of the AR object in a direction in which the deviation weight decreases.

(3)

The information processing device according to (2) above, in which the adjustment unit changes the arrangement position of the AR object in a direction in which the first distance increases and the second distance increases.

(4)

The information processing device according to (1) above, in which the weight calculation unit calculates the deviation weight in which a value increases as an absolute value of a difference between an object direction angle formed by a direction of a line-of-sight of a first user and a direction from the first user toward the AR object viewed by the first user and an other-user direction angle formed by the direction of the line-of-sight of the first user and a direction from the first user toward a second user decreases, and the adjustment unit changes the arrangement position of the AR object in a direction in which the deviation weight decreases.

(5)

The information processing device according to (4) above, in which the adjustment unit changes the arrangement position of the AR object in a direction in which the object direction angle increases.

(6)

The information processing device according to (4) or (5) above, in which in a case where the object direction angle is out of a range of an angle of view in which the AR device can display the AR object, the weight calculation unit obtains the deviation weight as 0.

(7)

The information processing device according to (1) above, in which the weight calculation unit calculates the deviation weight by also taking into account a size of the AR object, and the adjustment unit reduces the size of the AR object in a case where the deviation weight is a predetermined threshold or more.

(8)

The information processing device according to (1) above, in which
the adjustment unit changes a visual effect for the AR object in a case where the deviation weight is a predetermined threshold or more.

(9)

An information processing method including:
by an information processing device,
acquiring position information indicating a self position of an AR device that outputs an AR object shown to a user as if the AR object existed in real space by an augmented reality (AR) technology;
calculating a deviation weight which is an evaluation value indicating how easily a plurality of users recognizes that an arrangement position of the AR object is deviated from each other on the basis of position information of a plurality of the AR devices and the arrangement position of the AR object; and
adjusting an output method of the AR object according to the deviation weight to make it difficult to recognize occurrence of the deviation.

(10)

A program for causing a computer of an information processing device to execute information processing including:
acquiring position information indicating a self position of an AR device that outputs an AR object shown to a user as if the AR object existed in real space by an augmented reality (AR) technology;
calculating a deviation weight which is an evaluation value indicating how easily a plurality of users recognizes that an arrangement position of the AR object is deviated from each other on the basis of position information of a plurality of the AR devices and the arrangement position of the AR object; and
adjusting an output method of the AR object according to the deviation weight to make it difficult to recognize occurrence of the deviation.

Note that the present embodiment is not limited to the above-described embodiment, and various modifications can be made without departing from the gist of the present disclosure. Furthermore, the effect described in the present specification is merely an illustration and is not restrictive. Hence, other effects can be obtained.

REFERENCE SIGNS LIST

11 AR system
12 Network
13 AR device
13A First AR device
13B Second AR device
14 Server
15 AR object
21 Control unit
22 Input/output unit
31 Communication I/F controller
32 RAM
33 ROM
34 CPU
35 Output video controller
36 Input video controller
37R and 37L Display unit
38R and 38L Imaging unit
41 Communication I/F controller
42 RAM
43 ROM
44 CPU
51 Communication control unit
52 AR device position information acquisition unit
53 AR device position information management unit
54 Output video generation unit
55 Output video control unit
61 Communication control unit
62 AR device position information management unit
63 AR display object information determination unit
64 AR display object management unit
65 Deviation weight calculation unit

The invention claimed is:

1. An information processing device, comprising:
at least one processor configured to:
acquire position information which indicates a self position of an augmented reality (AR) device of a plurality of AR devices, wherein the AR device outputs, by an AR technology, an AR object shown to a user of a plurality of users as if the AR object existed in real space;
calculate a deviation weight based on the position information of each AR device of the plurality of the AR devices and an arrangement position of the AR object,
wherein the deviation weight is an evaluation value indicating an ease with which the user recognizes that the arrangement position of the AR object is deviated; and
adjust an output method of the AR object based on the deviation weight to make it difficult to recognize occurrence of the deviation of the arrangement position of the AR object.

2. The information processing device according to claim 1, wherein the at least one processor is further configured to:
calculate the deviation weight whose value increases based on
a decrease in a first distance from a first user of the plurality of users to the AR object viewed by the first user, and
a decrease in a second distance from a second user of the plurality of users to the AR object viewed by the second user; and
change the arrangement position of the AR object in a direction in which the value of the deviation weight decreases.

3. The information processing device according to claim 2, wherein the at least one processor is further configured to change the arrangement position of the AR object in a direction in which both the first distance and the second distance increase.

4. The information processing device according to claim 1, wherein
the at least one processor is further configured to:
calculate the deviation weight whose value increases based on a decrease in an absolute value of a difference between an object direction angle and an other-user direction angle decreases, wherein
the object direction angle is formed by a direction of a line-of-sight of a first user and a direction from the first user toward the AR object viewed by the first user, and
the other-user direction angle is formed by the direction of the line-of-sight of the first user and a direction from the first user toward a second user; and change the arrangement position of the AR object in a direction in which the value of the deviation weight decreases.

5. The information processing device according to claim 4, wherein the at least one processor is further configured to change the arrangement position of the AR object in a direction in which the object direction angle increases.

6. The information processing device according to claim 4, wherein in a case where the object direction angle is out of a range of an angle of view in which the AR device can display the AR object, the at least one processor is further configured to obtain the value of the deviation weight as 0.

7. The information processing device according to claim 1, wherein
the at least one processor is further configured to:
calculate the deviation weight based on a size of the AR object; and
reduce the size of the AR object in a case where the deviation weight is equal to or greater than a threshold.

8. The information processing device according to claim 1, wherein the at least one processor is further configured to change a visual effect for the AR object in a case where the deviation weight is equal to or greater than a threshold.

9. An information processing method, comprising:
by an information processing device,
acquiring position information indicating a self position of an augmented reality (AR) device of a plurality of AR devices, wherein the AR device outputs, by an AR technology, an AR object shown to a user of a plurality of users as if the AR object existed in real space;
calculating a deviation weight based on the position information of each AR device of the plurality of the AR devices and an arrangement position of the AR object,
wherein the deviation weight is an evaluation value indicating an ease with which the user recognizes that the arrangement position of the AR object is deviated; and
adjusting an output method of the AR object based on the deviation weight to make it difficult to recognize occurrence of the deviation of the arrangement position of the AR object.

10. A non-transitory computer-readable medium having stored thereon computer implemented instructions that, when executed by a processor, causes the processor to execute operations, the operations comprising:
acquiring position information indicating a self position of an augmented reality (AR) device of a plurality of AR devices, wherein the AR device outputs, by an AR technology, an AR object shown to a user of a plurality of users as if the AR object existed in real space;
calculating a deviation weight based on the position information of each AR device of the plurality of the AR devices and an arrangement position of the AR object,
wherein the deviation weight is an evaluation value indicating an ease with which the user recognizes that the arrangement position of the AR object is deviated; and
adjusting an output method of the AR object based on the deviation weight to make it difficult to recognize occurrence of the deviation of the arrangement position of the AR object.

11. An information processing device, comprising:
at least one processor configured to:
acquire position information which indicates a self position of an augmented reality (AR) device of a plurality of AR devices, wherein the AR device outputs, by an AR technology, an AR object shown to a user of a plurality of users as if the AR object existed in real space;
calculate a deviation weight based on the position information of each AR device of the plurality of the AR devices and an arrangement position of the AR object,
wherein a value of the deviation weight increases based on
a decrease in a first distance from a first user of the plurality of users to the AR object viewed by the first user, and
a decrease in a second distance from a second user of the plurality of users to the AR object viewed by the second user,
wherein the deviation weight is an evaluation value indicating an ease with which the user recognizes that the arrangement position of the AR object is deviated;
change the arrangement position of the AR object in a direction in which the value of the deviation weight decreases; and
adjust an output method of the AR object based on the deviation weight to make it difficult to recognize occurrence of the deviation of the arrangement position of the AR object becomes difficult.

* * * * *